No. 832,859.
PATENTED OCT. 9, 1906.
B. HAWK.
CULINARY CHOPPER.
APPLICATION FILED AUG. 1, 1904.
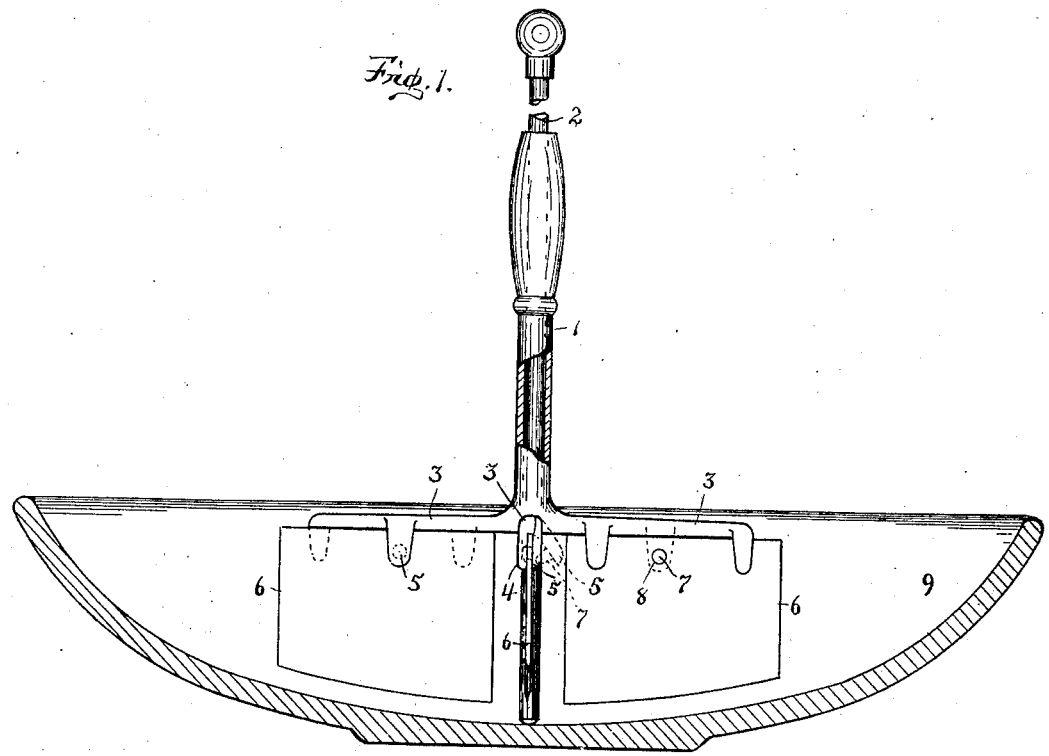
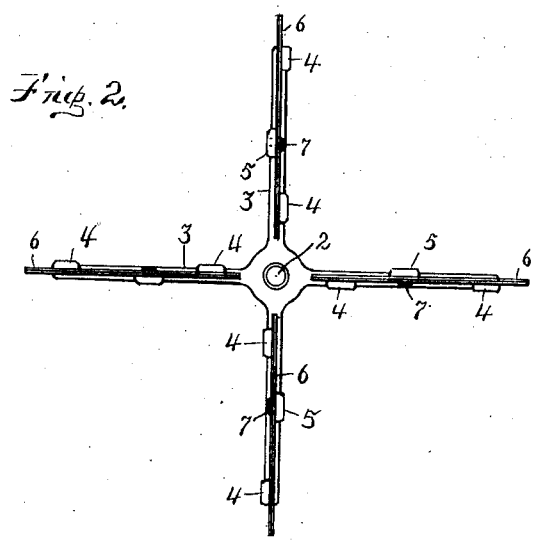
WITNESSES:
Bennett Hawk INVENTOR.
BY
ATTORNEY.

UNITED STATES PATENT OFFICE.

BENNETT HAWK, OF FORT WAYNE, INDIANA.

CULINARY CHOPPER.

No. 832,859.　　　　Specification of Letters Patent.　　　　Patented Oct. 9, 1906.

Application filed August 1, 1904. Serial No. 219,050.

*To all whom it may concern:*

Be it known that I, BENNETT HAWK, a citizen of the United States of America, and a resident of Fort Wayne, in the county of Allen and State of Indiana, have invented certain new and useful Improvements in Culinary Choppers, of which the following is a specification.

This invention relates to improvements in culinary choppers; and the object thereof is to provide, in connection with a chopping instrument, means to hold the containing vessel steady during the operation of the chopping instrument. I accomplish this object by the construction illustrated in the accompanying drawings, in which—

Figure 1 is a side elevation of the chopping instrument in position in a chopping-bowl, the latter being shown in section; and Fig. 2 is a bottom plan of the chopping instrument.

Similar numerals of reference indicate corresponding parts in both views.

Referring to the drawings, 1 is the handle of the chopping instrument, and 3 represents radial arms at the lower end thereof. 4 represents downwardly-extending lugs ranging upon corresponding sides of said arms, and 5 represents downwardly-extending lugs arranged upon the corresponding sides of said arms opposite the lugs 4. 6 represents cutting-blades arranged, respectively, in connection with the said arms 3, with their upper edges inserted between said lugs 4 on one side of the blades and the lugs 5 upon the opposite sides thereof. The lugs 5 each has a stud 7, which extends so as to be adapted to extend through a corresponding hole 8 in the corresponding blade. The casting forming the handle 1 and arms 3 is made of malleable iron or other metal capable of being bent in order to reduce the liability of breakage and also to render it suitable to bend the lugs 5 outwardly, so that the blades may be inserted between the lugs 4 and the corresponding ends of the studs 7 when said lugs 5 are bent outward. When the blades are thus placed in position, the lugs 5 are bent back into normal position against the corresponding sides of the blade 6, with their studs 7 projecting through the holes 8 in said blades. The projecting ends of said studs are then upset, and said blades are thereby secured permanently in rigid connection with the corresponding arms 3.

The handle 1 is hollow, and a guide-rod 2 is inserted through said handle, and the handle, together with its attached blades, is adapted to be moved vertically and rotatively upon said rod.

In the use of this invention the rod 2 is inserted in the handle, as aforesaid, and the material to be chopped is placed in a suitable chopping-bowl 9. The top of the rod 2 is then grasped by one hand and the handle 1 by the other, and the lower end of the rod 2 is then placed within the chopping-bowl and pressed downward firmly, so as to hold said bowl steady, and then the handle is reciprocated upon said rod, so that the blades strike the material to be chopped.

Having described my invention, what I claim as new, and desire to secure by Letters Patent, is—

In apparatus of the class described the combination with the chopping-bowl, of a chopper having blades in connection with a central hollow handle, and the guide-rod having a handle at its upper end, and extending loosely through said handle with its lower end acting against the bowl, for the purpose specified.

In testimony whereof I affix my signature in presence of two witnesses.

BENNETT HAWK.

Witnesses:
H. J. LAMPKE.
W. G. BURNS.